April 20, 1954        H. MAURER        2,675,904
FRONT-FEED ATTACHMENT DEVICE FOR BOOKKEEPING MACHINES
Filed Nov. 2, 1950        7 Sheets-Sheet 1
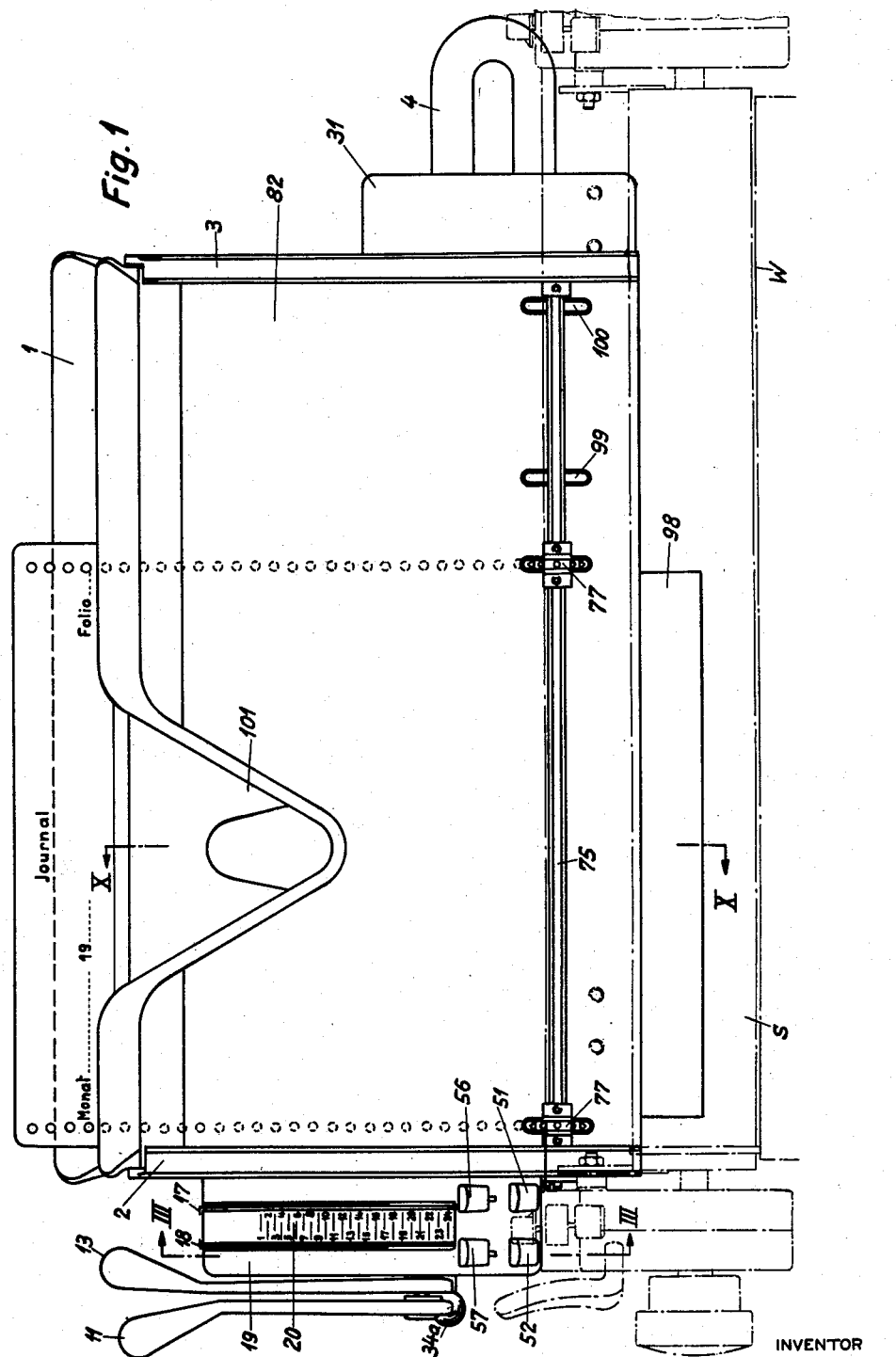
INVENTOR
HANS MAURER
ATTORNEYS April 20, 1954     H. MAURER     2,675,904
FRONT-FEED ATTACHMENT DEVICE FOR BOOKKEEPING MACHINES
Filed Nov. 2, 1950     7 Sheets-Sheet 2
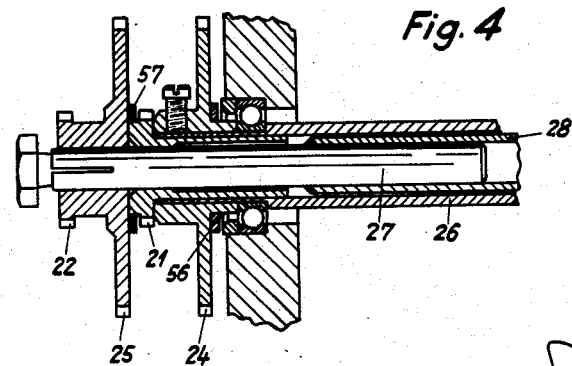
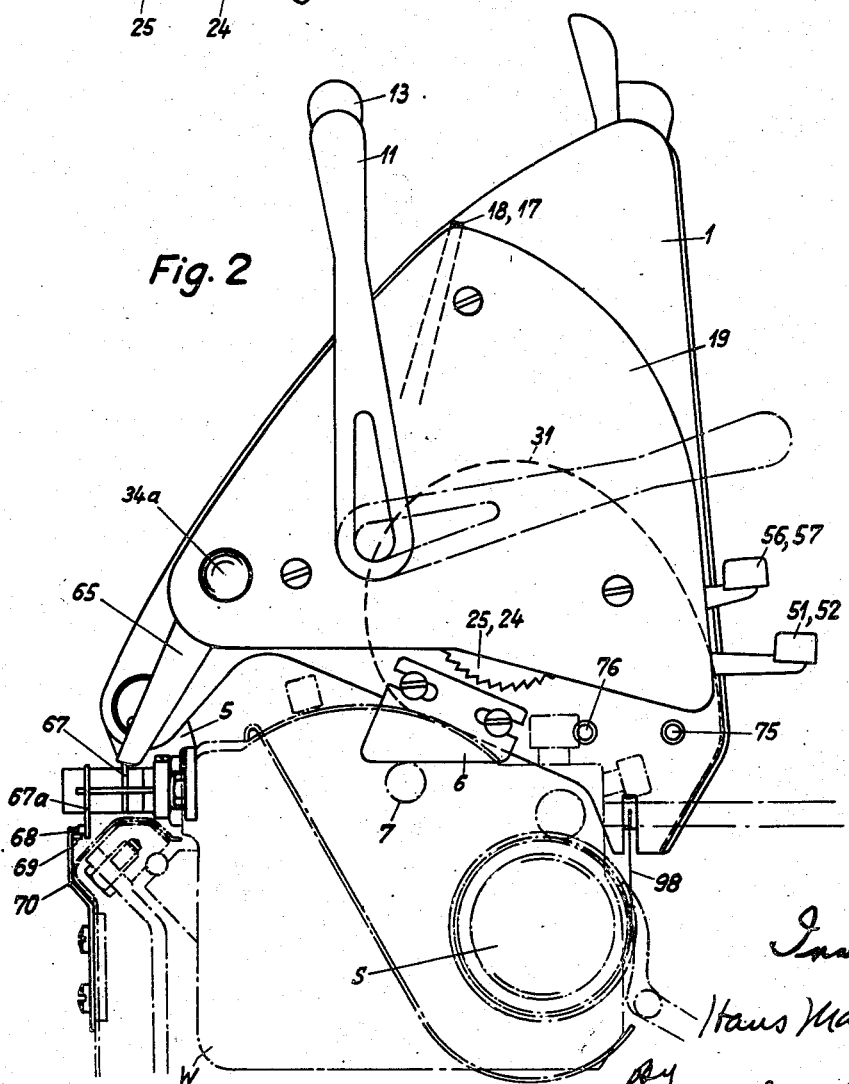

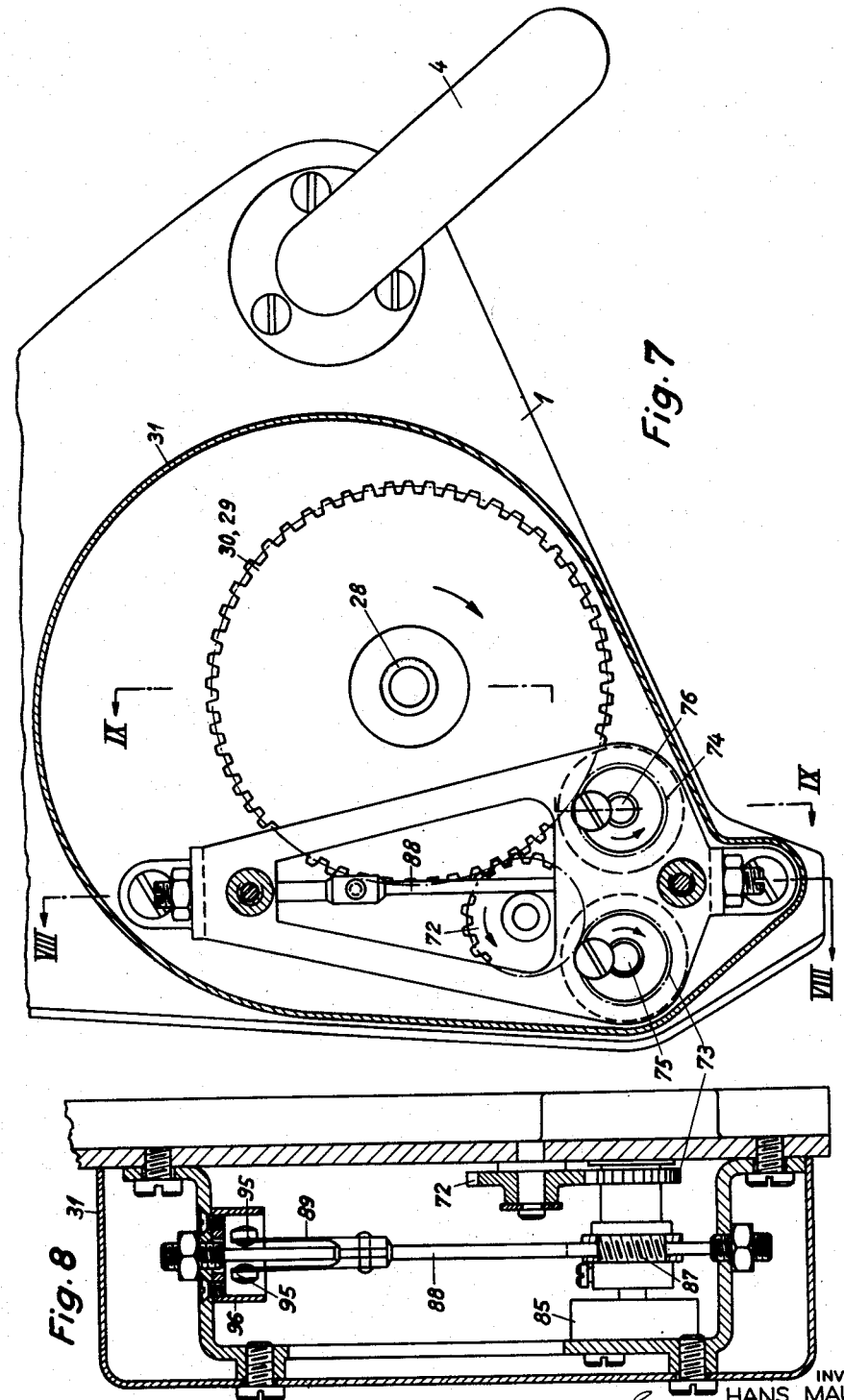

April 20, 1954          H. MAURER          2,675,904
FRONT-FEED ATTACHMENT DEVICE FOR BOOKKEEPING MACHINES
Filed Nov. 2, 1950          7 Sheets-Sheet 6

Inventor
Hans Maurer

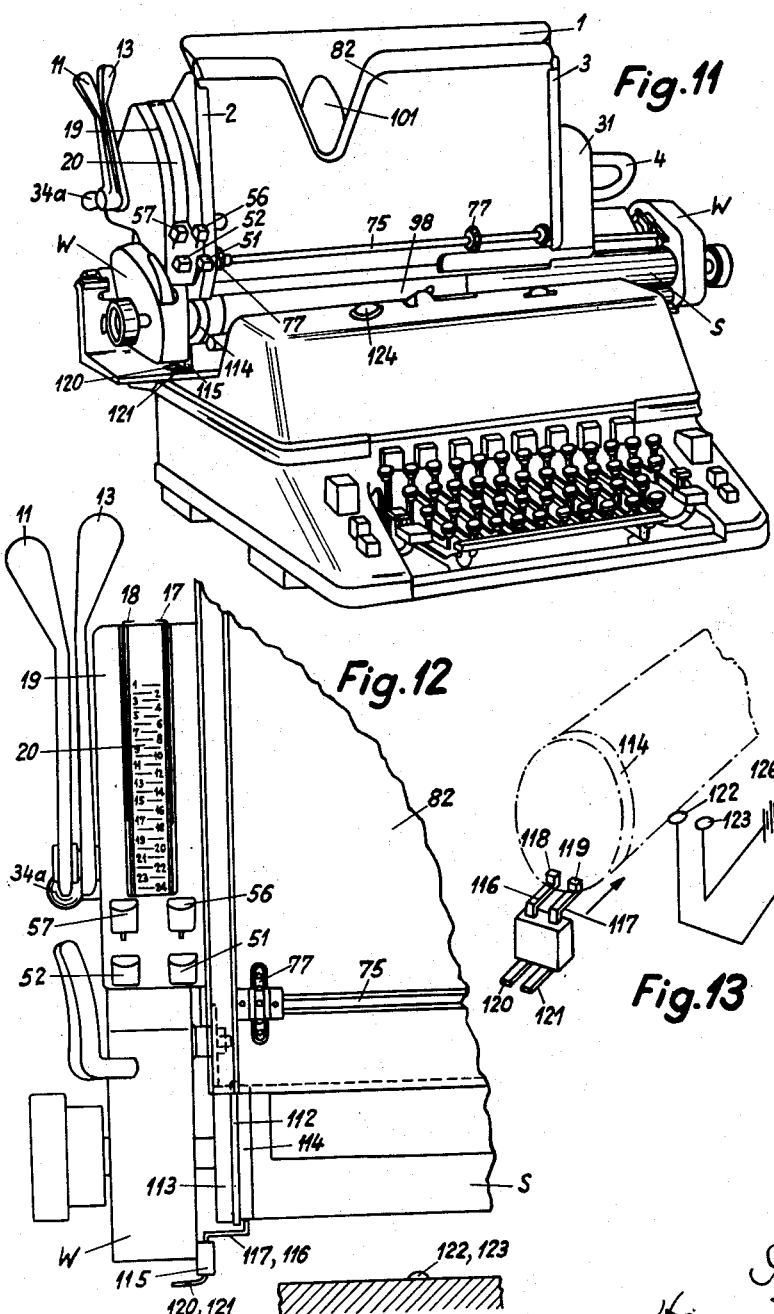

Patented Apr. 20, 1954

2,675,904

UNITED STATES PATENT OFFICE 2,675,904

FRONT-FEED ATTACHMENT DEVICE FOR BOOKKEEPING MACHINES

Hans Maurer, Zug, Switzerland, assignor to Ruf-Buchhaltung Aktiengesellschaft, Zurich, Switzerland Application November 2, 1950, Serial No. 193,584

19 Claims. (Cl. 197—128)

1

The invention relates to a typewriter office machine comprising devices for bookkeeping and for indicating the last line of the sheets, bookkeeping sheets or otherwise, to be typed upon.

It is a main object of the invention to provide an office machine of the kind referred to wherein at least two bookkeeping sheets can be adjusted to the line to be typed upon independently of one another.

It is another object of the invention to provide an office machine of the kind referred to wherein the typist is automatically warned when the last line available on a sheet for being typed upon has in fact been typed upon so that the sheet has to be exchanged for a new one.

It is a further object of the invention to provide an office machine of the kind referred to wherein at least two sheets can be typed upon without requiring the interposition of a carbon paper.

It is still another object of the invention to provide an office machine of the kind referred to wherein the objects set forth hereinabove can be achieved with sheets of different width.

These and other features of the invention will become apparent from the description of some preferred embodiments of the invention given merely by way of example with reference to the accompanying drawing.

In order that the invention may be better understood and readily carried into effect—

Fig. 1 shows the front attachment device in front elevation,

Fig. 2 shows the same in side elevation on a larger scale,

Fig. 4 is a section along the line 4—4 of Fig. 3,

Figure 9:
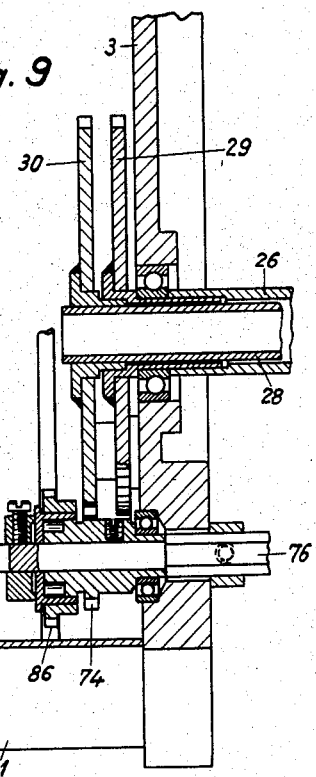
Figure 10:
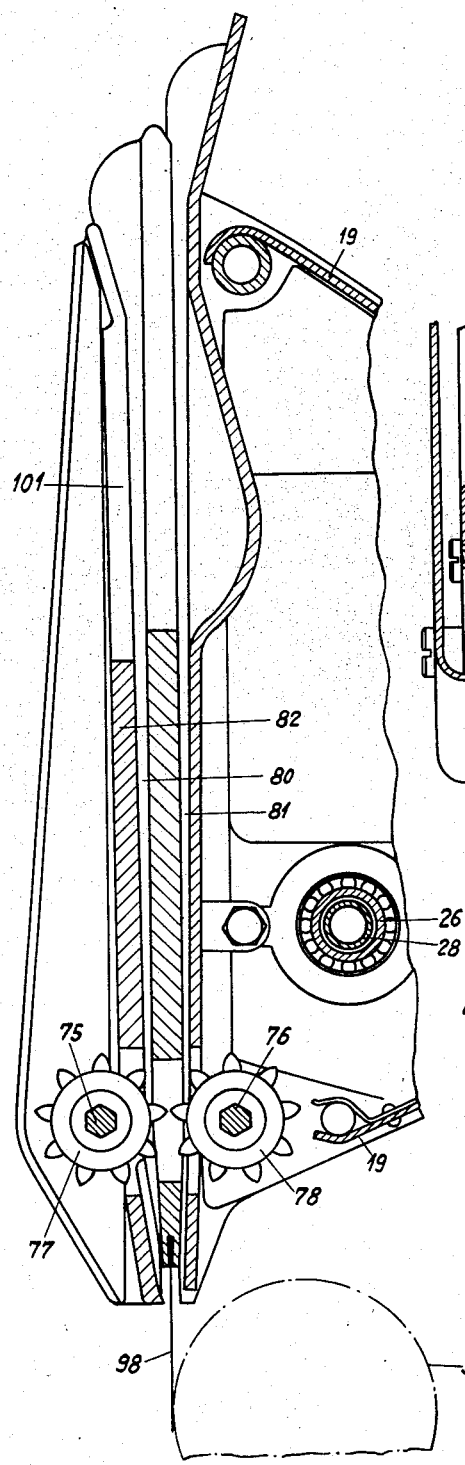

Fig. 7 is a side elevation as seen from the side opposite to that of Fig. 2 with the cowling in section, Fig. 8 is a section along the line 8—8 of Fig. 7, Fig. 9 is a section along the line 9—9 of Fig. 7, Fig. 10 is a section along the line 10—10 of Fig. 1, Figs. 3 to 10 being all on the same scale.

Fig. 11 is a perspective view on a smaller scale of a bookkeeping machine on which an indicating device for the end of the journal sheet is attached.

Fig. 12 is a part view, corresponding to the left hand end of Fig. 1 and on the same scale as the latter, of an office machine of the kind represented in Fig. 11, and Fig. 13 is a diagrammatic representation of the indicating device circuit.

2

Figures 3, 5:
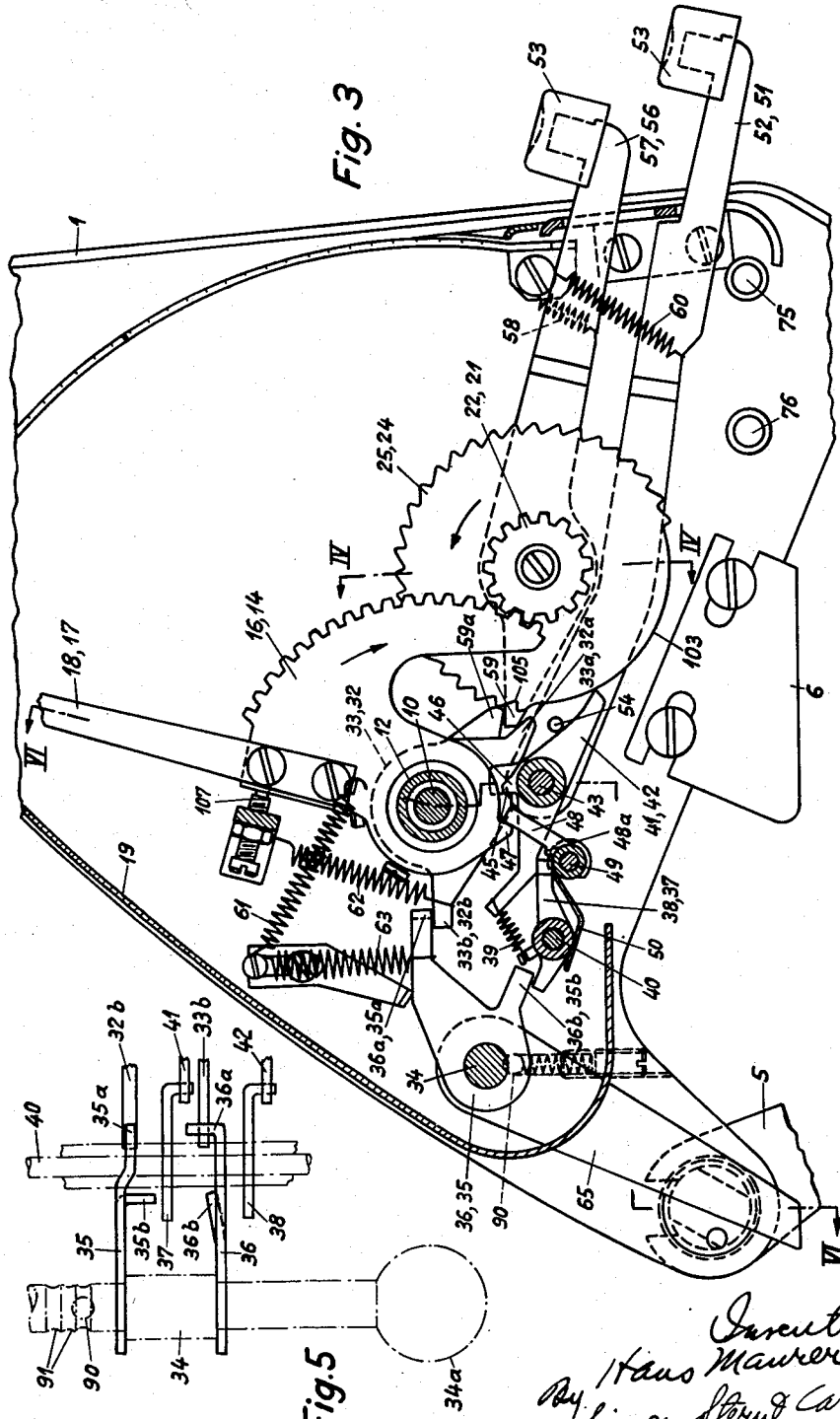
Fig. 3 is a section along the line 3—3 of Fig. 1 on a still larger scale.
Fig. 5 is a detail of Fig. 3 in plan view.
Figure 6:
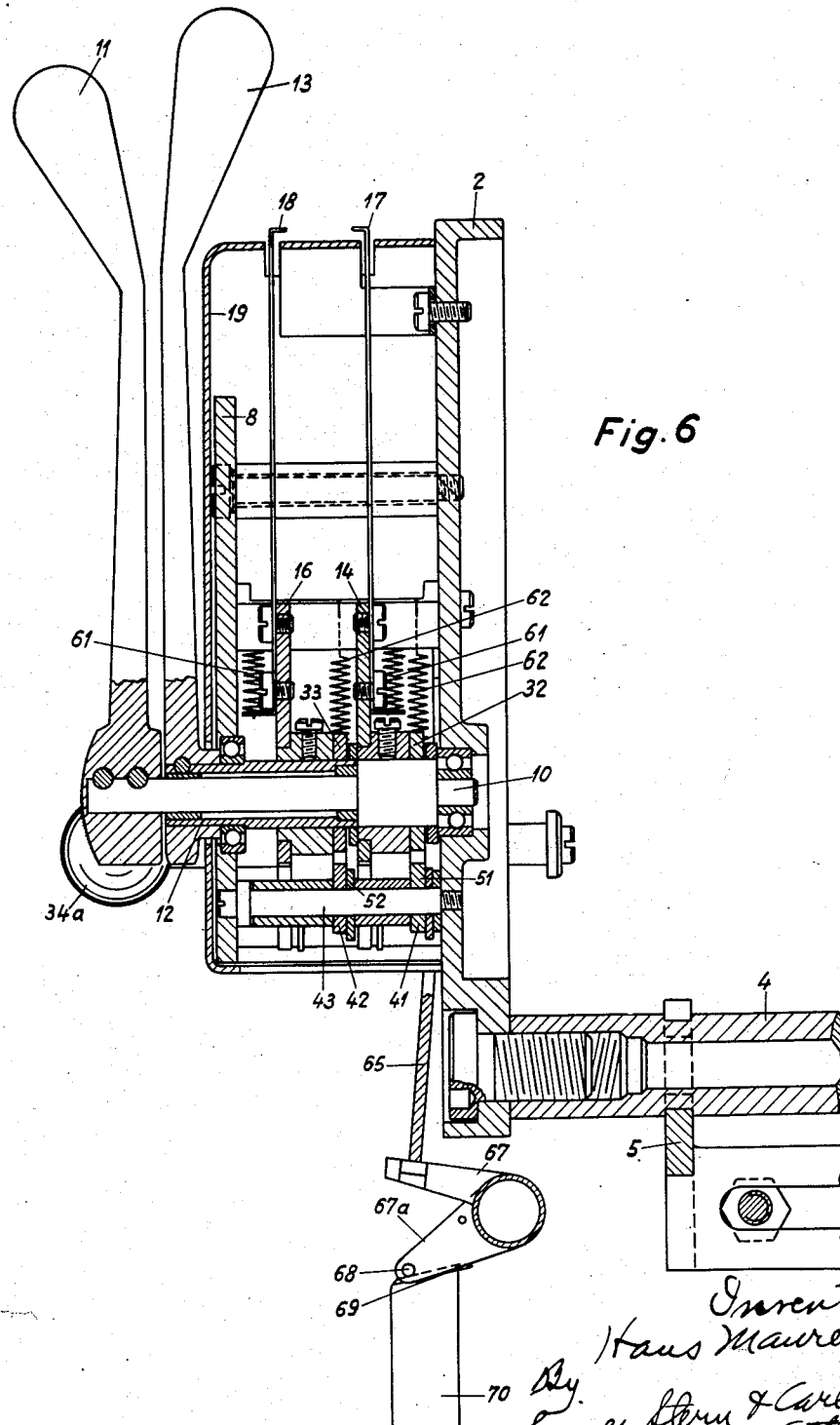
Fig. 6 is a section along the line 6—6 of Fig. 3.

The front-feed attachment device shown has a casing 1 which is provided with the two side walls 2 and 3. The two walls 2, 3 are connected with one another by means of an axle 4 which can be inserted into a bracket 5 attached to the typewriter carriage W (Figs. 2 and 6). On the casing 1 abutments 6 are arranged which, as shown in Fig. 2, come to bear on pins 7 of the typewriter carriage W and thereby secure the device in a position appropriate for typing. By shifting the abutments 6, the level of the device relative to the typewriter platen S can be accurately determined. Parallel to the wall 2 there is a second wall 8 which is rigidly connected to the first mentioned wall. In the two walls 2, 8 a shaft 10 is rotatably journalled which carries at its outer end a hand lever 11. Coaxially to the shaft 10 and journalled on the same there is a sleeve 12 which in turn carries a hand lever 13. The two levers 11 and 13 (Figs. 1, 2 and 6) lie directly side by side on the left hand end of the device. A toothed segment 14 is fixedly connected with the shaft 10 and an accurately identical segment 16 is fixedly connected with the sleeve 12. The segment 14 carries a pointer 17 and the segment 16 carries a pointer 18 both of which project beyond the cowling 19 and are intended to play on a scale 20. Toothed pinions 21 and 22 respectively are in mesh with the segments 14 and 16 (Fig. 3). A partly toothed ratchet disc 24 is fixedly connected with the pinion 22, and an identical ratchet disc 25 is fixedly connected with the pinion 21. The gear 21 and ratchet wheel 24 are in fixed connection with a hollow shaft 26, while the gear 22 and ratchet wheel 25 are fixedly connected by a pin 27 with a hollow shaft 28 (Fig. 4). The two shafts 26 and 28 penetrate the casing 1 of the device and carry on their free ends a gear wheel 29 and 30, respectively. These two gear wheels are arranged within the brake casing 31 (Figs. 7 and 9).

On the shaft 10 a transmission member 32 (Figs. 3 and 6) and on the sleeve 12 an identically constructed transmission member 33 is idly mounted. The cam projections 32a and 33a, respectively (Fig. 3) of the latter can be brought into engagement with the toothed ratchet discs 24 and 25, respectively. On the transmission members 32 and 33 noses 32b and 33b, respectively, are arranged, on which abut the front ends 35a, 36a of control levers 35 and 36. The two control levers 35 and 36 are mounted on an axle 34 which in turn is journalled axially shiftably in the walls 2 and 8. The levers 35 and 36 have projections 35b and 36b, respectively, which cooperate with two-armed levers 37 and 38, respectively. The two latter are also idly mounted between the walls 2 and 8 on an axle 40 and are under the action of springs 39. Two-armed detent levers 41 and 42, respectively, bear on the levers 37 and 38, which detent levers are tiltably arranged on an axle 43. These levers 41 and 42 cooperate also with the two toothed ratchet discs 24 and 25. The transmission members 32 and 33 each have an abutment face 45 on each of which bears a nose 46 of the levers 41 and 42 owing to the action of the springs 39. The segments 14 and 16 each have a projection 47, against which bear the locking arms 48 which are tiltably arranged on an axle 49 and which are under the action of torsion springs 50.

On the axle 43 (Fig. 3) two ejector levers 51 and 52 are idly mounted which are provided with keys 53, at their outer ends. Each of the levers 51 and 52 carries a pin 54 which cooperates with the lever arms 41 and 42, respectively. Coaxially to the ratchet discs 24 and 25 two line spacer levers 56 and 57 are tiltably arranged which are held in their upper end position by the action of springs 58. The levers 56 and 57 each have an arm 59, which cooperates with the transmission members 32 and 33 respectively. The levers 51 and 52, too, are held in their upper end positions by spring 60; the levers 56 and 57, too, are provided at their outer ends with keys 53. Spring 61, 62 and 63 tend to hold the segments 14, 16, the transmission members 32 and 33, as well as the levers 35 and 36 in the position represented in Fig. 3.

On the axially shiftable axle 34 an arm 65 is attached which projects downward beyond the casing 19. This last mentioned lever arm extends into the operative range of a bell crank lever 67 (Figs. 2 and 6), which is tiltably pivoted on the typewriter carriage W. One arm, 67a, of the bell crank lever 67 carries a pin 68 which can run up on to a guide 69 which is designed as part of a stationary control member 70 attached to the typewriter frame.

The gear 29 is in mesh with a pinion 72 (Figs. 7 and 8) which meshes with a further pinion 73. The gear 30 meshes with a further pinion 74. The two pinions 73 and 74 are fixedly attached to shafts 75 and 76, respectively, the latter carrying sprocket wheels 77 and 78, respectively (Figs. 1 and 10). The sprockets of the wheels 77 and 78 project into guide slots 80 and 81 of the sheet holder 82 which serves as the front closure wall of the device. On each shaft 75 and 76 a torsion spring 84 (Fig. 9) is attached at the outer end, which springs lie each in a separate casing 85. Moreover a worm wheel 86 is arranged on each of the shafts 75 and 76 both of which worm wheels mesh with a common worm 8 (Fig. 8). The shaft 88 of the worm 87 carries a centrifugal brake 89 by means of which the speed of the shafts 75 and 76 can be limited. As shown in Figs. 7 to 9, the whole brake device is arranged in the casing 31.

The operation of the device is as follows:

For the purpose of typing on the journal sheet, the latter is shifted from the top into the guide slot 81 until it comes to lie on to a sprocket of each of the sprocket wheels 78 (Fig. 10). In an analogous manner an account sheet is shifted into the guide slot 80, in front of the journal sheet and comes to lie on to a sprocket of each of the sprocket wheels 77. In order to adjust the journal sheet to the line to be typed on, the hand lever 13 is swung forward, whereby the pointer 18 is adjusted on the scale 20 by the segment 16. If for example the tenth line is to be typed on on the journal sheet, the lever 13 is rocked forward so far that the pointer 18 comes to stand over the number "10" of the scale 20. Thereby the journal sheet is brought into the desired position. When the lever 13 with the segment 16 is rocked, the hollow shaft 28, too, is accordingly turned through the pinion 22. Thereby the shaft 76 is turned through the gear 30 and the pinion 74 (Fig. 7). Consequently the torsion spring 84 arranged on the latter is tensioned, while the sprocket wheels 78 effect the transport of the journal sheet into its desired position.

For the adjustment of the account sheet to the desired typing position, the hand lever 11 is rocked forward, until the pointer 17 indicates on the scale 20 the number that corresponds to the line to be typed on of the account sheet. By the adjustment of the lever 11 at the same time via the segment 14 the pinion 21 is set into rotation and via the shaft 26 thereof and the gears 29, 72, 73 also the shaft 75. Thereby the torsion spring 84 on the latter, too, is tensioned while the sprocket wheels 77 thereof effect the transport of the account sheet into the correct position. The two torsion springs 84 can, however, not expand, since the front ends of the detent levers 41 and 42 engage into the teeth of the ratchet discs 24, 25 and accordingly arrest the same in their position. The two sheets, i. e. the journal and the account sheet can now be typed on.

As soon as the typewriter carriage W has reached its left hand side end position, it is returned, either by hand or, on electrical machines automatically, to its initial position on the right hand side. Shortly before reaching the initial position, the arm 67a (Figs. 2, 3 and 6) of the bell crank lever 67 hits the guide 69 and causes the lever 67 to rock in a clockwise direction since the pin 68 thereof runs upward on the guide 69. Thereby tilting of the arm 65 and rotation of the axle 34 is initiated whereby also a rotation of the control levers 35 and 36 is effected. As shown in Figs. 3 and 5, the ends 35a and 36a of the levers 35 and 36 rest on the projections 32b and 33b of the transmission members 32, 33. By the rocking of the levers 35, 36 accordingly the transmission members find an abutment, so that their noses 32a and 33a, respectively, enter into engagement with the teeth of the ratchet discs 24, 25. The latter, too, have been turned, as stated hereinabove, when the gears 21, 22 were turned and have been arrested by the levers 41, 42, so that in the actual moment the toothed parts of the ratchet discs 24, 25 were in juxtaposition to the noses 32a and 33a. Simultaneously with the deflection of the transmission members 32, 33 and owing to the abutment faces 45 which bear on to the noses 46 of the levers 41, 42, the latter are turned about their axle 43 against the action of the springs 39. Consequently the lower pawl-shaped ends of the levers 41, 42 have been tilted out of the range of the teeth of the ratchet discs 24, 25. However, the latter are arrested by the noses 32a and 33a. As soon as the roller 68 runs off the guide 69 the springs 62, 63 are capable of returning the transmission members 32, 33 and the control levers 35, 36, respectively, into the position illustrated in Fig. 3. It follows that the noses 32a and 33a are disengaged from the teeth of the ratchet discs 24, 25. At the same time, however, the springs 39 retract the levers 41 and 42, too, into their position as illustrated, whereby their lower ends engage again into the teeth of the ratchet discs 24, 25. The distance of the noses 32a and 33a of the transmission members 32, 33 as well as of the lower ends of the levers 41 and 42 is such that during the movements mentioned hereinabove the ratchet discs 24, 25 are adjusted back one tooth owing to the action of the torsion springs 84 as well as owing to the action of the springs 61 which engage the segments 14, 16. This backing causes, via the components 26, 28, 29, 30, 72, 73, 75, 76, a rotation of the sprocket wheels 77 and 78, whereby the journal sheet as well as the account sheet are moved a line spacing. The latter are accordingly ready for being typed on anew. During the movement of the typewriter carriage to the left hand side the pin 68 (Fig. 6) passed below the guide 69 and accordingly is incapable of effecting a displacement of the arm 65.

As set forth hereinabove, a line spacing is effected of the journal sheet as well as of the account sheet. When the axle 34 is axially shifted a certain distance by means of the knob 34a, Figs. 5 and 6, the control levers 35 and 36 are shifted in the axial direction. The new position of the axle 34 is secured by a ball 90 (Figs. 3 and 5) which is under spring bias and which engages into grooves 91 of the axle. In the new position of the levers 35 and 36 the end 35a (Fig. 5) is no longer over the nose 32b of the transmission member 32. On the other hand the projection 35b of the lever 35 lies now above the lever 37. The end 36a of the lever 36 which has an upturned part, keeps lying over the nose of the transmission member 33. From what has been said it follows that when the arm 65 is tilted again, i. e. when the typewriter carriage has been brought back to its right hand side end position, the transmission member 33 is again deflected by the end 36a of the lever 36. Thereby it is made possible in the manner mentioned already hereinbefore, that the toothed ratchet disc 25 is turned back a tooth, and that the journal sheet is spaced another line. Owing to the renewed rocking of the arm 65 and accordingly of the axle 34, a tilting of the lever 37 about its axle 40 is effected by the projection 35b of the lever 35, to wit in an anticlockwise direction. Since, as stated hereinabove, the segments 14 and 16 have been turned, the two locking arms 48 (Fig. 3) are released by the projections 47; accordingly they bear on to the levers 37 and 38 under the action of the springs 50. When now the lever 37 is rocked, the shoulder 48a of the lever 48 bearing on the former moves below the lever 37 under the action of the spring 50 in order to keep the latter in the tilted position. By the rocking of the lever 37 a rocking of the lever 41, too, has been caused against the action of the spring 39. Since the lever 37 remains in its tilted position owing to its abutting on the shoulder 48a, the lever 41, too, remains in its tilted position and accordingly out of engagement with the teeth of the ratchet disc 24. The consequence thereof is that the torsion spring 84 (Fig. 9) arranged on the shaft 75 can expand, and in turn shift the account sheet in the guide slot 80 upwards by means of the sprocket wheels 77 (Fig. 10) so far that it can be freely taken out. On the other hand the pointer 17 as well as the hand lever 11 are restored to their initial position by the shaft 75 through the components 73, 72, 29, 26, 24, 21 and 14. In a manner described already hereinabove, a new account sheet can now be inserted into the guide slot 80, and by the renewed rocking of the lever 11 the same can be brought into its appropriate position for being typed upon. The journal sheet is already in a position in which it can be typed upon anew.

The axle 34 can be shifted axially a further stretch, to wit so far that the end 36a of the control lever 36 does no longer lie above the nose 33b of the transmission member 33. However, the projection 36b has been brought into a position above the lever 38, while the projection 35b lies still above the lever 37. When in this position the arm 65 (Fig. 3) is again rocked, the rocking of both the levers 37 and 38 is effected through the projections 35b and 36b which levers remain secured in their tilted position by the shoulders 48a of the two arms 48, in the same manner as described hereinabove with reference to the lever 37. Consequently the two levers 41 and 42, too, are rocked, and their lower ends are disengaged from the teeth of the ratchet discs 24, 25. It is clear that in this case both shafts 75, 76 are turned owing to the action of the torsion springs 84. From what has been said hereinabove it follows, that the journal sheet as well as the account sheet are moved back, to wit so far that they rest on a sprocket of each of the sprocket wheels 78 or 77, respectively. At the same time the pointers 17, 18 and the hand levers 11, 13 have been brought back into their initial position in the manner already represented.

As will be seen from Fig. 3, the ratchet discs 24 and 25 have a toothed portion and a smooth circular portion 103. When e. g the lowest line of the journal sheet is in the position for being typed upon, the forward end of the lever 42 engages into the portion 103 free of teeth of the ratchet disc 25. As soon as this line is typed upon and the typewriter carriage returns into its right hand side position, a spacing movement of the journal sheet is effected as described hereinabove. Since the front end of the lever 42 thereby comes to lie on the part 103 of the ratchet disc 25, the torsion spring 84 of the shaft 76 can expand until the pointer 18 has reached its uppermost end position and the segment 16 comes to bear on to the adjustable abutment 107. Thereby the journal sheet is adjusted upward until it rests on the sprocket wheels 78 only and can be freely drawn out of the guide slot 81.

In exactly the same manner the account sheet, too, is thrown out in its guide slot after the last line on it has been typed upon.

From what has been set forth hereinabove it follows that the following courses of motions of the bookkeeping sheets are capable of being adjusted entirely automatically:

1. Line spacing of the account sheet and of the journal sheet,
2. Line spacing of the journal sheet and ejection of the account sheet.
3. Ejection of the journal sheet and of the account sheet.

The ejection of each sheet after the last line of it has been typed upon is effected, to wit independently of one another, in any case owing to the smooth circular portion 103 of the ratchet discs 24 or 25, respectively.

The release of the journal sheet or of the account sheet can be effected by hand, instead of automatically as described. For this purpose levers 51, 52 and 56, 57 are provided. When the lever 51 is depressed by touching its key 53, the pin 54 thereof (Fig. 3) is capable of tilting the lever 41, whereby its lower end leaves the teeth of the ratchet disc 24. The consequence thereof is that the shaft 75 can turn back owing to the action of the torsion spring 84, and that the account sheet is shifted upward in the guide slot 80 so far that it rests freely on a sprocket of the sprocket wheels 77 and can be removed therefrom without difficulty. When however the key 53 of the ejector lever 52 is pressed, the journal sheet is shifted upward until it can be taken out of the guide slot 81 freely. The levers 56, 57 serve for the line spacing of the account sheet or of the journal sheet, respectively. When the lever 56 is depressed by means of the key 55, its arm 59 causes by a special nose 59a of the transmission member 32 a tilting of the latter, which is accurately identical with the tilting that would occur if the same would have been effected by the control lever 35, i. e. that the account sheet is spaced one line whenever the lever 56 is depressed once. When, however, the lever 57 is depressed, the transmission member 33 is rocked through the corresponding arm 59 of this lever 57 and a nose 59a of said transmission member, in the same way as if it would have been effected by the control lever 26. In this case it is the journal sheet that is spaced one line.

Lest the rotation of the shafts 75 and 76 be effected too quickly, a centrifugal brake is provided as shown in Figs. 7 and 8. Upon rotation of one of the said shafts, a rotation of the shaft 88 is effected via the components 86 and 87, whereby the brake body 95 is pressed, in a manner known in itself, more or less strongly against the brake cylinder 96 whereby braking of the shafts 75, 76 is effected.

As shown in Fig. 10 an ink ribbon 98 is exchangeably arranged at the lower end of the sheet holder 82, the journal sheet being positioned behind, and the account sheet in front of, the said ribbon. In this manner it is possible to type on the journal sheet without the interposition of a carbon paper. From Fig. 1 it will be seen that further openings 99 and 100 are provided in the sheet holder 82. Into these openings the right hand side sprocket wheels 77 and 76 are inserted when larger journal sheets and account sheets are used. The recess 101 (Fig. 10) in the sheet holder 82 allows a safe gripping of the sheets to be inserted into the same or to be taken out of the same.

In Figs. 11 to 13 a device for indicating the lower end of the journal sheet is represented. The machine illustrated has the usual platen S which is provided at its left hand side end with a radially projecting annular flange 112. To the left and to the right of this flange 112 there are arranged metal rings 113 and 114, respectively which cover on the points indicated the whole circumference of the platen. On the carriage W carrying the platen S a bracket 115 is arranged which carries the two S-shaped contact pieces 116, 117. One end of these contact pieces, 118, 119, respectively, bears resiliently on the said metal ring 114. The legs 120, 121, respectively, arranged on the other ends of the said contact pieces form sliding contact with the cooperating stationary contact pieces 122, 123, respectively, arranged on the typewriter. The latter form part of a circuit in which a signal lamp 124, a switch 126 and a current source (battery) 125 are arranged.

The operation of the device described is as follows:

The bracket 115 with the two contact pieces 116, 117 moves at each course of the carriage W over the stationary contact pieces 122, 123. However no closing of the circuit containing these contact pieces takes place as long as on the platen S a journal sheet is arranged, which covers the ring 114. As long as this is the case, the two contact pieces 118, 119 are electrically insulated from one another. This insulation is effected, to wit, by the bookkeeping sheet (not shown in this figure) covering the platen S. As soon as, however, this bookkeeping sheet is spaced along so far that its lower end slides out of the range of the contact pieces 118, 119, the latter are conductively connected with one another by the ring 114, and as soon as the sliding contact pieces 120, 121 come to bear on the contact pieces 122, 123 the circuit of the signal lamp 124 is closed. The typist is accordingly warned by the lamp being switched on, that the last line on the journal sheet has been typed upon. Of course the contact pieces 118, 119 are so arranged on the circumference of the platen S that the journal sheet leaves the range of the contacts 118, 119 when its last line has been typed upon. The contact pieces 120, 121 and 122, 123 are arranged in such a manner, that they bear on one another, when the carriage has returned to its starting position after the last line of the journal sheet has been typed upon.

By the switch 126 the circuit can be interrupted, when the indicating device is not needed.

The subject of this development has been described hereinabove in conjunction with a bookkeeping machine where its application is particularly convenient and advantageous. It is, however, obvious that the same device can be applied to ordinary typewriters as well.

I wish it to be understood that I do not desire to be limited to the exact details of construction shown and described, for obvious modifications will occur to a person skilled in the art.

What I claim as my invention and desire to secure by Letters Patent, is:

1. A typewriter machine, comprising in combination: a machine frame, a carriage, a spring biasing the said carriage towards the end of the lines to be typed, operating means for returning the said carriage to the beginning of said lines overriding the force of the said spring, a platen rotatably journalled in the said carriage, a stationary abutment arranged on the said machine frame, a guide means for at least two separate sheets arranged on the said carriage, separate transporting means for each sheet arranged on the said guide means independently of one another and of the machine platen, separate adjustment means connected to the said transporting means setting each of the said sheets independently to a selected line position, separate indicating means indicating each the line position of a sheet connected with the said separate adjustment means, respectively, separate spring means loaded by the said adjustment means when setting each of the said sheets to a line position and connected to the said transporting means, respectively, separate detent means keeping the said spring means in the loaded condition, separate automatic release means connected with the said detent means, respectively, and cooperating with the said stationary abutment towards the end of the return movement of the machine carriage to the beginning of a new line to release the said detent means, separate manually operated release means releasing their associated detent means when operated, and common adjustable selector means connected with the said separate automatic release means and having positions selecting alternatively the step-by-step spacing of all of the said sheets by releasing the said detent means temporarily at the end of the return movement of the said carriage, the step-by-step spacing of one sheet and the complete discharge of another sheet by temporarily releasing one detent means and completely releasing the other detent means, and the complete discharge of all of the said sheets by completely releasing all of their associated detent means.

2. In a typewriter machine having a frame, a carriage, and a platen rotatably journalled in the carriage, a device for controlling the line position of the sheet to be typed upon in said machine, comprising in combination: mechanical spacing means independent of the machine platen engaging the said sheet and spring biased lever means cooperating with the said mechanical means, both the said mechanical means and the said lever means being arranged on the machine carriage and partaking in the to-and-fro movement thereof independently of a turning movement of the machine platen, stationary cam means attached to the machine frame cooperating with the said lever means towards the end of the return movement of the machine carriage to the beginning of a new line only, adjustment means connected to the said mechanical means setting the said sheet to a selected line position, and spring means connected to the said mechanical means loaded by the said adjustment means when adjusting the line position of the said sheet, the said lever means when cooperating with the said stationary cam means releasing the said spring means for operating the said mechanical means in the sense of advancing the said sheet.

3. The combination claimed in claim 2 comprising in addition: position sensitive means response to the position of the said sheet, detent means cooperating with the said position sensitive means and with the said spacing means limiting the movement of the latter to one line spacing at a time of the said sheet until the last line to be typed upon is reached, the said position sensitive means presenting a smooth portion to the operatively positioned detent means upon the return of the carriage after the termination of the last line to be typed, whereby the said spring means are allowed to expand completely and to move the said spacing means into a position disengaging the said sheet.

4. A front-feed attachment device for the carriage of a typewriter machine controlling and indicating the spacing position of a top sheet to be typed directly upon and of at least one other sheet to be typed upon indirectly through the said top sheet, comprising in combination: separate adjustment means individually adjusting each sheet to a selected line position, separate spring means associated with each of the said adjustment means and loaded when adjusting the line position of the respective sheet, separate detent means retaining each of the said spring means in the loaded condition, separate release means for each detent means, and common selector means alternatively selecting the joint release of all of the said detent means one line spacing at a time, the joint complete release of the said detent means, and the release of one detent means one line spacing at a time with simultaneous complete release of the other detent means by the said release means.

5. A front-feed attachment device as claimed in claim 4, comprising in addition: for each sheet, separate position-sensitive means responsive to the line position of its associated sheet and operatively connected to the detent means of the spring means associated therewith, allowing a step-by-step release until the last line to be typed on said sheet is completed, and completely releasing the same when reaching a position corresponding to the completion of the last line to be typed thereon.

6. A front-feed attachment device as claimed in claim 4, comprising in addition: for each sheet, separate manually operated release means cooperating with the detent means of the spring means associated therewith, releasing the same one spacing step upon each manual operation.

7. A front-feed attachment device as claimed in claim 4, comprising in addition: for each sheet, separate manually operated release means cooperating with the detent means of the spring means associated therewith, releasing the same completely when manually operated once.

8. A front-feed attachment device as claimed in claim 4, comprising in addition: guide means for the said sheets, and an ink ribbon attached to the lower edge of the said guide means in a position between the top sheet and the other sheet in front of the machine platen, whereby the typing on to the top sheet is transferred on to the other sheet independently of the typewriter ink ribbon and of a carbon paper.

9. A front-feed attachment device as claimed in claim 4, comprising in addition: overdrive gearing means operatively connected to the said adjustment means, and centrifugal brake means connected to the said gearing means limiting the rotational speed thereof.

10. A front-feed attachment device for the carriage of a typewriter bookkeeping machine independently controlling the line position of an account sheet to be typed upon directly and of a journal sheet to be typed upon indirectly thru the said account sheet, comprising in combination: for each sheet a manually operable adjustment lever, a toothed segment fixedly connected to the said lever, a toothed gear pinion in mesh with the said segment, a first shaft extending in the direction of the carriage motion, a spur gear wheel, the said shaft connecting the said pinion with the said spur gear wheel for rotation, a spur gear pinion in mesh with the said spur gear wheel, a second shaft connected with the said spur gear pinion and extending parallel to the said first shaft over the length of the machine carriage, sprocket wheels fixedly arranged on the said second shaft and engaging into corresponding perforations of the associated bookkeeping sheet, a ratchet wheel fixedly arranged on the said first shaft, torsion spring means arranged on the said second shaft loaded by the rotation of the said second shaft effected by the operation of the said adjustment lever and tending to rotate the said second shaft in the spacing direction of the associated bookkeeping sheet, a pawl member engaging the said ratchet wheel and restraining it from rotating under the action of the said torsion spring means, and automatic control means in operative connection with the said pawl member and adapted to cooperate with a stationary abutment member arranged on the machine frame towards the end of each return movement of the machine carriage to the beginning of a new line for releasing the said ratchet wheel for rotation in the spacing direction of the associated bookkeeping sheet.

11. A front-feed attachment device as claimed in claim 10, comprising in addition: for each sheet a scale fixedly attached to the device, and a pointer playing on said scale and fixedly connected to the said adjustment lever, the said pointer indicating on the said scale the line adjusted of the associated sheet by the said adjustment lever.

12. A front-feed attachment device as claimed in claim 10, comprising in addition: for each sheet a manually operable key operatively connected to one of the said pawl members and when operated releasing the said ratchet wheel to turn one tooth only whereby the associated sheet is advanced one line.

13. A front-feed attachment device as claimed in claim 10, comprising in addition: for each sheet a manually operable key operatively connected to one of the said pawl members and when operated releasing the said ratchet wheel completely to turn until the associated torsion spring means is completely expanded whereby the associated sheet is ejected.

14. A front-feed attachment device as claimed in claim 10, wherein the said ratchet wheels have each a toothed circumferential portion operatively engaged by the said pawl member corresponding to the spacing range of the associated sheet from the first to the last line to be typed upon, and a smooth portion inoperatively engaged by the said pawl member corresponding to the range of said sheet beyond the last line, whereby the said torsion spring means expands one tooth of the ratchet wheel at a time from the first line to the last, and expands completely after the termination of the last line, and the sheet is automatically ejected.

15. A front-feed attachment device as claimed in claim 10, wherein the said automatic control means include a double-armed control lever pivoted on the machine carriage, spring-biased for sliding contact of one arm with a cam-shaped stationary abutment on the machine frame, and with the other arm in operative connection with the said pawl member, whereby upon deflection of the said first arm by the said stationary abutment the said pawl member is disengaged by the other arm of the said control lever temporarily from the said ratchet wheel.

16. A front-feed attachment device as claimed in claim 15, comprising in addition: for each sheet a bell crank lever in operative connection with the said control lever, a double-armed transmission member engaging with one arm an arm of the said bell crank lever and with the other arm the said ratchet wheel, and a projection on the said transmission member, the said projection being resiliently engaged by the said pawl member, whereby upon deflection of the said control lever the said pawl member is disengaged from the said ratchet wheel and the said transmission member is engaged into the said ratchet wheel after a rotational movement thereof corresponding to one line spacing of the associated sheet.

17. A front-feed attachment device as claimed in claim 16, comprising in addition: a common shaft torsionally connecting the said bell crank levers to the said control lever and axially shiftable together with the said bell crank levers relative to the said control lever, manually operable selector means for shifting the said shaft longitudinally, and resilient detent means arresting the said shaft in selected positions.

18. A front-feed attachment device as claimed in claim 17, wherein the arms of each bell crank lever are turned axially at their ends, and comprising in addition: for each sheet a two-armed intermediary lever having one arm coordinated with an arm of one of the said bell crank levers and the other arm coordinated with one of the said pawl members, the said shiftable shaft having a first position wherein one arm of each bell crank lever engages an arm of its associated transmission member whereby upon deflection of the said control lever each ratchet wheel is released one tooth only and consequently both sheets are advanced one line at a time; a second position wherein one bell crank lever is disengaged from its associated transmission member and engaged with its associated intermediary lever, while the other bell crank lever with its axially turned end still engages its associated transmission member and is still disengaged from its associated intermediary lever whereby upon deflection of the said control lever one ratchet wheel is completely released and the associated sheet is completely ejected, while the other ratchet wheel is released one tooth only and consequently the associated sheet is advanced one line at a time; and a third position wherein both bell crank levers are disengaged from their associated transmission members and each is engaged with its associated intermediary lever, whereby upon deflection of the said control lever both said pawl members are completely disengaged from their respective ratchet wheels and consequently both sheets are ejected.

19. A front-feed attachment device as claimed in claim 18 comprising in addition: a projection arranged on each of the said toothed segments, for each of the said segments a pivoted locking arm cooperating with the said projection of its associated segment, and a shoulder on each of the said locking arms cooperating wtih one of the said intermediary levers whereby the said intermediary levers are arrested in their position deflected by the associated bell crank lever unless the said locking levers are engaged by the said projections of the said segments and swung out of engagement with the said intermediary levers.

References Cited in the file of this patent

UNITED STATES PATENTS

| Number | Name | Date |
|---|---|---|
| 531,893 | Ashby | Jan. 1, 1895 |
| 2,086,945 | Pfeiffer | July 13, 1937 |
| 2,142,603 | Brown et al. | Jan. 3, 1939 |
| 2,216,081 | Kniehahn et al. | Sept. 24, 1940 |
| 2,326,291 | Dodge et al. | Aug. 10, 1943 |
| 2,387,068 | Hegnauer | Oct. 16, 1945 |
| 2,411,335 | Prezioso | Nov. 19, 1946 |